United States Patent [19]

Bonczyk

[11] Patent Number: 4,886,180
[45] Date of Patent: Dec. 12, 1989

[54] REINFORCEMENT FOR A PLASTIC FUEL TANK

[75] Inventor: John C. Bonczyk, Union Lake, Mich.

[73] Assignee: Chrysler Motors Corporation, Highland Park, Mich.

[21] Appl. No.: 282,361

[22] Filed: Dec. 9, 1988

[51] Int. Cl.$^4$ .................... B60K 15/02; B65D 88/12
[52] U.S. Cl. .................... 220/5 A; 220/1 B; 220/72; 280/834
[58] Field of Search ............ 220/66, 71, 72, 72.1, 220/83, 5 A, 5 R, 1 B, 85 S; 280/830, 834

[56] References Cited

U.S. PATENT DOCUMENTS

| | | |
|---|---|---|
| 3,330,439 | 7/1967 | Moorman . |
| 3,335,903 | 8/1967 | Anderson . |
| 3,406,855 | 10/1968 | McKechnie . |
| 3,952,904 | 4/1976 | Verlinden ........................... 220/5 R |
| 3,957,171 | 5/1976 | Besser ................................. 220/71 |
| 4,518,091 | 5/1985 | Scheurenbrand et al. . |
| 4,609,120 | 9/1986 | Lauer et al. . |

FOREIGN PATENT DOCUMENTS

| | | |
|---|---|---|
| 3026116 | 2/1982 | Fed. Rep. of Germany ..... 220/5 A |
| 3325449 | 2/1982 | Fed. Rep. of Germany ...... 280/834 |
| 0552605 | 12/1956 | Italy ..................................... 220/71 |

Primary Examiner—Jimmy G. Foster
Attorney, Agent, or Firm—Kenneth H. MacLean, Jr.

[57] ABSTRACT

A fuel tank of blow molded plastic which has an elongated bottom needing reinforcement, the reinforcement including an elongated groove or channel molded in the tank bottom and an elongated tubular plastic reinforcement member, both member and channel having complimentary shapes with narrowed mid portions cooperative together to retain the tubular member in the channel thereby forming a composite structure.

5 Claims, 3 Drawing Sheets

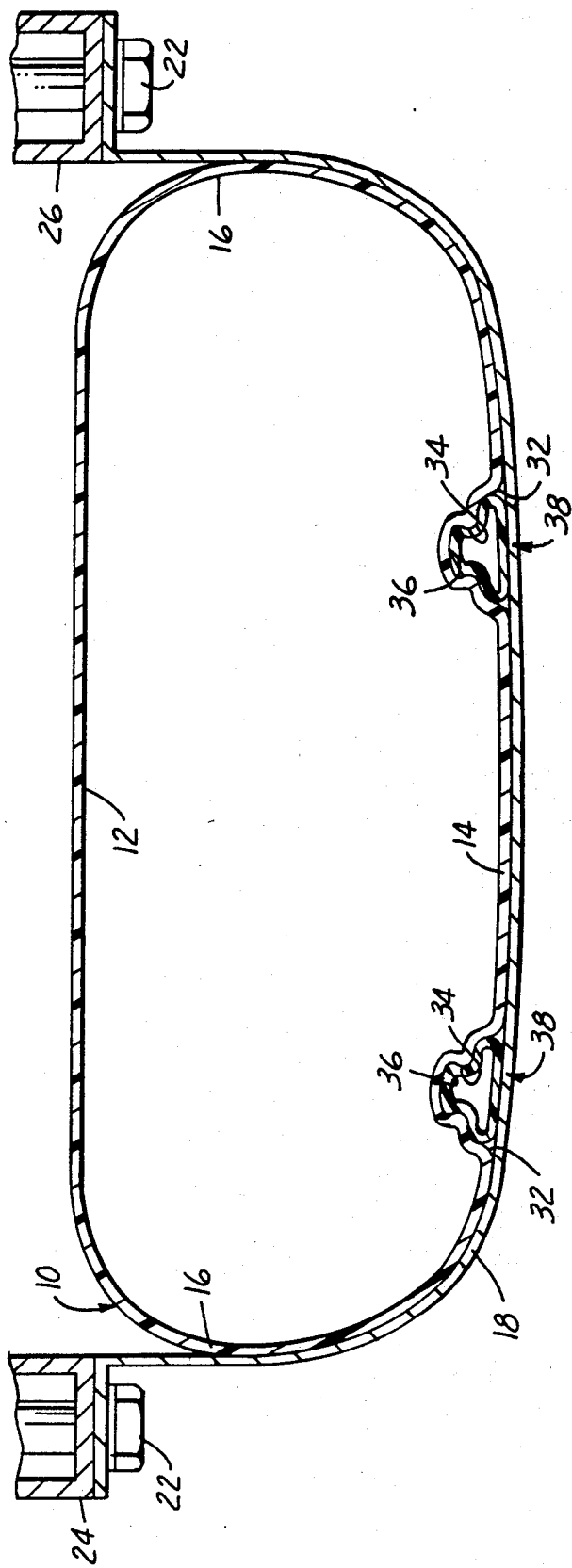
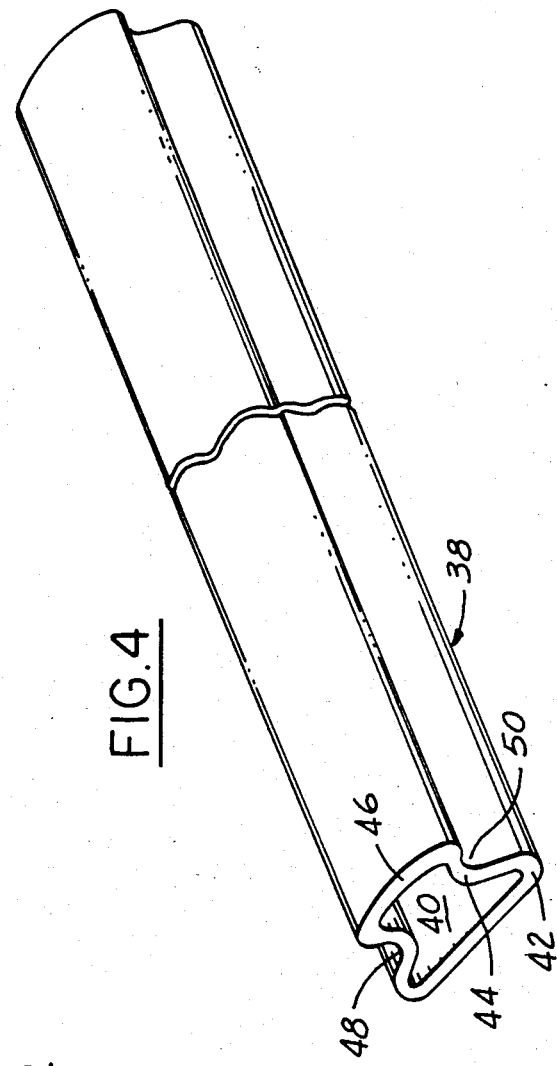
FIG.3
FIG.4

REINFORCEMENT FOR A PLASTIC FUEL TANK

BACKGROUND OF THE INVENTION

The use of elastomeric or plastic material for vehicle fuel tanks has advantages over metal tanks. Such tanks can be readily manufactured by the inexpensive blow molding technique. However, some plastic fuel tanks that have a large bottom surface may exhibit support problems. With some fuel tank configurations and in some vehicles, only two support straps can be used to secure the tank to the vehicle structure. These straps may have to be placed at a relatively wide spacing interval. Between these straps, the weight of the fuel and internal pressures tend to cause the tank bottom to sag.

There have been previous attempts to reinforce walls of fuel tanks. For example, U.S. Pat. No. 3,406,855 to McKechnie discloses a liquid tank with metal reinforcement members attached thereto by fasteners. U.S. Pat. No. 3,335,903 to Anderson discloses a plastic tank with reinforcement ribs molded in the walls of the tank. U.S. Pat. No. 4,609,120 to Lauer discloses a plastic container with channels formed in the bottom to receive V-shaped members which are slid in from open ends of the groove.

U.S. Pat. Nos. 3,330,439 and 4,518,091 to Moorman and Scheurenbrand disclose fuel tanks with elongated recesses molded or stamped in the surface of the walls for imparting strength to the walls.

SUMMARY OF THE INVENTION

It is seen from the references identified above that a plastic fuel tank with some form of wall reinforcement is known. Likewise, the use of a reinforcement member fitted into a channel is also known.

The subject plastic fuel tank is readily made by the known blow molding process. The mold has portions therein to produce generally hourglass shaped channel means in the bottom wall of the tank. The channel means has a narrowed entrance portion and a wider inner space. An elongated reinforcement member is used to strength the tank's bottom wall in cooperation with the channel means. The member has a generally hourglass shaped cross-section with a narrowed neck portion and widened end portions. The widened end portion is adapted to be pressed into the channel past the narrowed entrance thereof and be retained therein.

The reinforcement member is pressed into the channel of the tank right after the tank is removed from the mold. At this time, the plastic tank is hot. Under these conditions, the widened end portion of the reinforcement member more easily passes through the narrowed entrance. As the hot fuel tank cools the, the channel contracts about the reinforcement member. This even more rigidly holds the member to the wall of the fuel tank.

Therefore, an object of the invention is to provide a simple and reliable composite reinforcing for the wall of a plastic tank.

A further object of the invention is to provide an improved means to reinforce the wall of a plastic tank by molding a channel in the tank wall and inserting a reinforcement member therein.

A still further object of the invention is to provide an improved reinforcement for a wall of a blow molded liquid storage tank by molding a channel in the wall which has a narrowed entrance and a widened interior space and then pressing a reinforcement member into the channel which has a narrowed mid portion and a wider end portion whereby the member is pressed into the channel while the walls are hot followed by cooling which contracts the channel portions about the member.

Further advantageous features and objects of the subject plastic fuel tank will be more readily apparent from a reading of the following detailed description of an embodiment, reference being made to drawings of a preferred embodiment.

IN THE DRAWINGS

FIG. 1 is an elevational and partially sectioned view of the subject plastic fuel tank and support structure; and FIG. 2 is an planer view of the bottom surface or wall of the subject plastic fuel tank and support structure; and FIG. 3 is a sectioned view of the fuel tank taken along section line 3—3 in FIG. 1 and looking in the direction of the arrows; and FIG. 4 is a perspective view of the tubular reinforcement device for the fuel tank shown in the other views.

DESCRIPTION OF A PREFERRED EMBODIMENT

Figure 1:
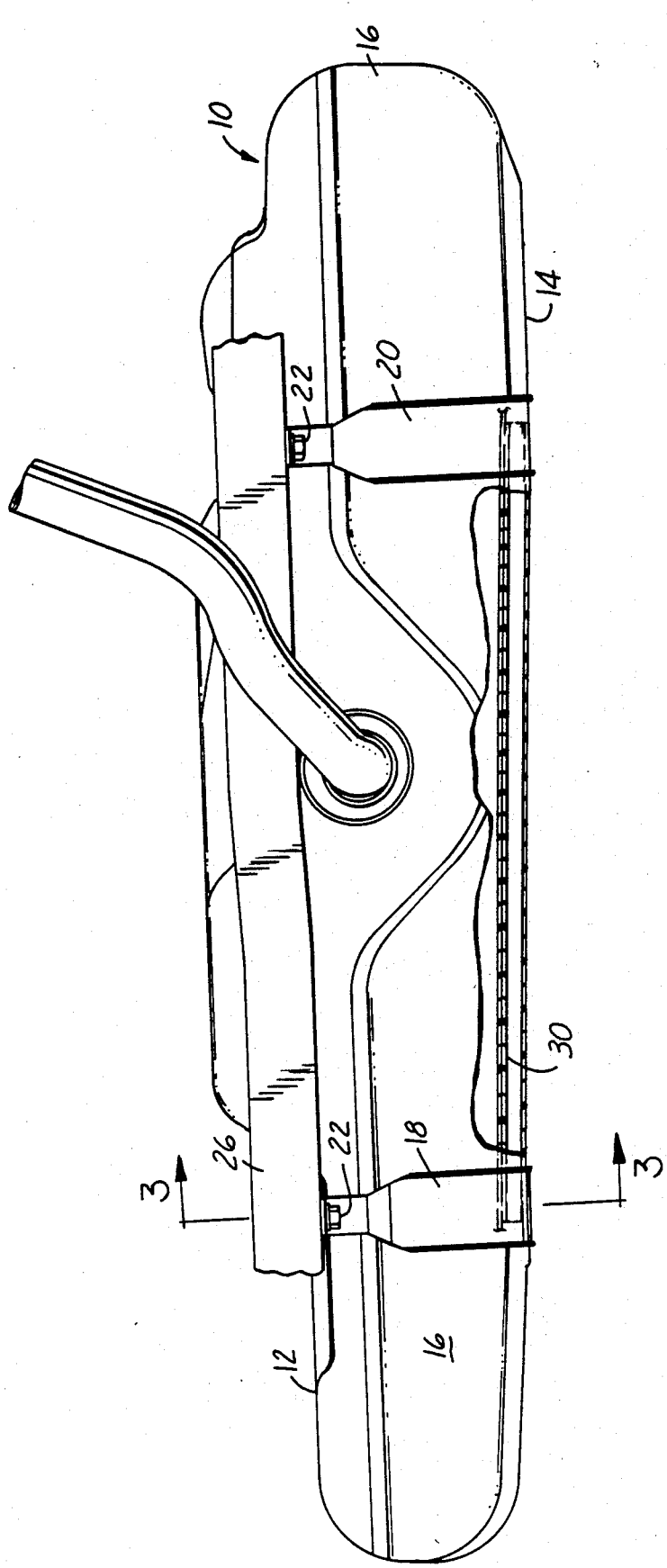
Figure 2:
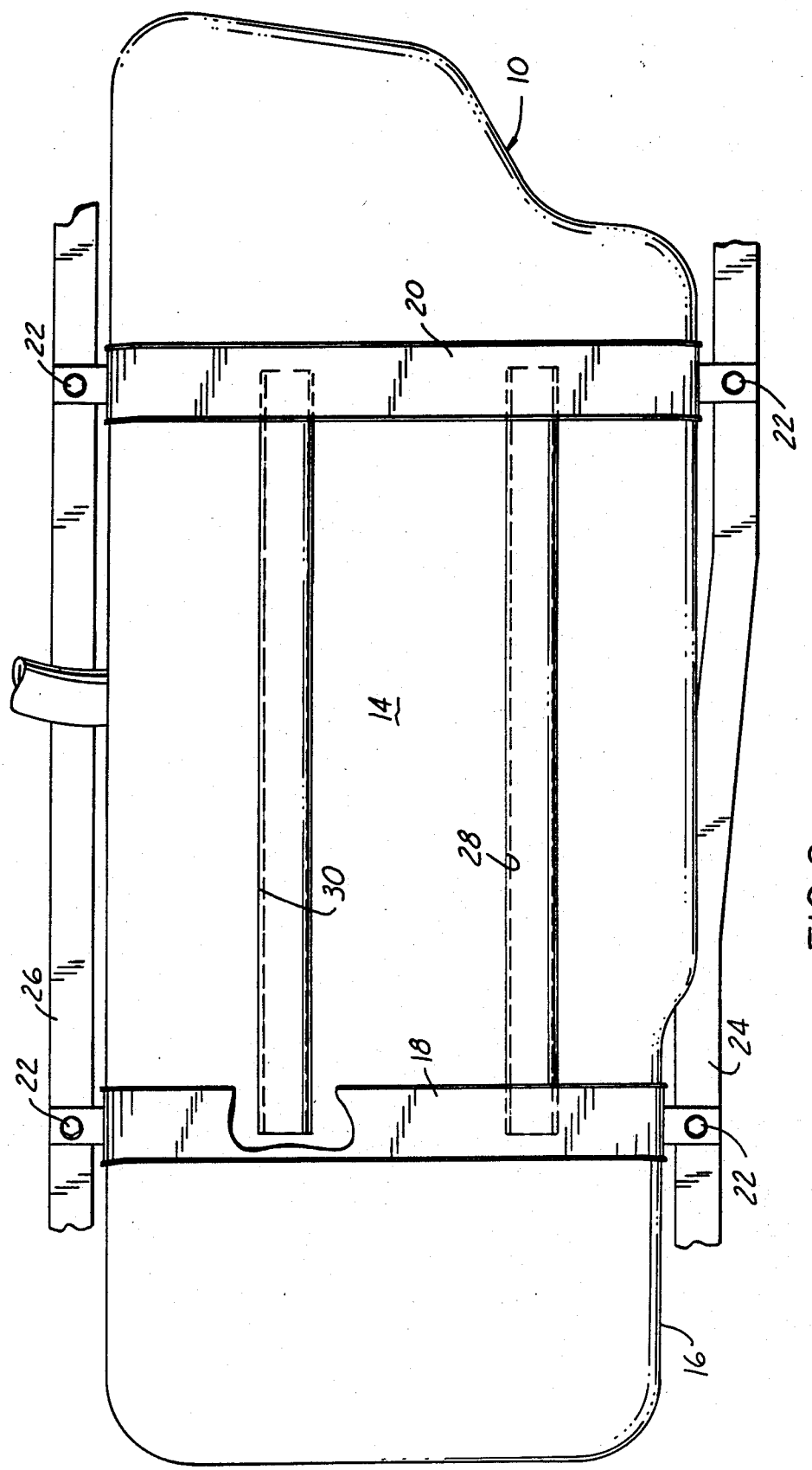

In FIGS. 1 and 2, a plastic fuel tank 10 is illustrated. Tank 10 is a molded thin walled enclosure for storing fuel in a vehicle. It includes a top 12 and bottom 14 wall and integral side wall portions 16. The tank bottom (as well as the top) has a relatively large area and is elongated as shown in FIGS. 1, 2. The large surface areas and the elongation of the fuel tank are the result of necessary design configurations in modern vehicles. Typically, the space available for the fuel tank is limited in height and width. Thus, the illustrated design if necessitated.

The above described large area and elongated design configuration of the plastic tank creates problems when only two supports are used to secure the tank to the vehicle as is typical. Specifically, a pair of support strap means 18 and 20 are illustrated in FIGS. 1, 2 and 3. The ends of the straps 18, 20 are secured by fasteners 22 to the vehicle structural members 24 and 26. As can be seen, the straps 18, 20 are spaced at wide intervals from one another. This wide spacing is usually the result of the availability of places to connect the strap ends and consequentially the number of straps is limited to two and the space interval is quite large. As a result, the large area, elongated bottom 14 of the fuel tank tends to bulge downward when the weight of a full tank of fuel is imposed on the bottom.

A solution to the bulging problem is to reinforce the bottom wall as illustrated in the drawings. As shown in FIG. 1 and 2, the bottom wall 14 is molded with a pair of channels 28 and 30 formed therein. Specifically, the channels are spaced from one another and extend between and then under the strap members 18, 20. As best shown in FIG. 3, each channel has an hourglass shaped cross-sectional configuration. The hourglass configuration includes a relatively wide lower opened portion 32 adjacent a narrowed entrance portion 34. Just above the narrowed entrance portion 34, a slightly widened closed portion 36 is formed. Each of these hourglass configured grooves or channels 28, 30 contribute to rigifying the bottom surface 14 of the plastic fuel tank.

In FIG. 4, an elongated plastic reinforcing member 38 is illustrated. Member 38 is tubular with a hollow interior 40. In end view as shown in FIG. 4, the member 38 has an hourglass cross-sectional configuration similar to the shape of the grooves 28 and 30. Specifically, the member 38 has a lower wide end portion 42 adjacent a narrowed neck portion 44. Finally, adjacent to the neck portion 44 is a widened portion 46.

The neck portion 44 of the member 38 has spaced outer or external surfaces 48, 50 which are spaced the same distance as the outer surfaces of bottom wall 14 which define the narrowed entrance portion 34 of the grooves or channels 28 and 30. Likewise, the shape and size of the widened upper portion 46 of member 38 is configured to closely conform to the size and shape of the upper portion 36 of the channels 28, 30. Finally, the lower wide portion 42 of member 38 is configured to conform to the shape and size of the lower portion 32 of the channels.

The tubular nature of the member 38 and the previously described size and shape conformity between a channel and the member 38 allows member 38 to be pressed into a channel 28 or 30 and be held there. Specifically, the portion 46 of member 38 is passed through the narrow entrance portion 34 of a channel. The resultant composite reinforcement of this design greatly strengthens the bottom wall 14 of the fuel tank to prevent bulging.

Specifically, the plastic fuel tank is manufactured by the blow molding procedure. With this procedure, the tank comes out of the mold quite hot and therefore resilient. While the tank is still hot, the portion 46 of a reinforcement member 38 is pressed through the narrowed entrance 34. As the tank cools, the hourglass shaped channels contract about the similarly shaped reinforcement. When fully cooled, the tank securely retains the member 38 in a channel. Specifically, the portions 44 and 46 are very tightly secured in the channel by conforming portions of the bottom wall.

Although the preceding detailed description of the reinforced fuel tank is specific to only one embodiment, the invention is not necessarily limited to the specific details except as described in the claims. It also should be understood that the specific device is subject to modifications which may not fall outside the scope of the following claims which define the invention.

I claim:

1. A plastic fuel tank for a vehicle having a reinforced bottom wall necessitated because the tank can only be supportingly attached to the associated vehicle at widely spaced intervals, comprising: a molded tank enclosure having an elongated channel molded in the bottom wall which extends between the widely spaced support intervals, the channel having a narrowed entrance portion and a widened interior portion adjacent the entrance portion; an elongated tubular plastic reinforcement member with a cross-sectional configuration substantially conforming to the shape of the channel, the member having a narrowed mid portion with an outer dimension corresponding to the width of the channel's narrowed entrance portion and an adjacent side portion having a slightly wider dimension corresponding to the widened interior portion of the channel; the plastic tank and reinforcement member being sufficiently resilient to allow pressing the member's wider side portion past the narrowed entrance portion and into the widened interior portion of the channel whereby the reinforcement member and the channel forming portions of the tank wall are tightly held together for rigidifying the bottom of the tank between the spaced intervals.

2. A plastic fuel tank for a vehicle having a reinforced bottom wall necessitated because the tank can only be supportingly attached to the associated vehicle at widely spaced intervals, comprising: a molded tank enclosure having an elongated channel molded in the bottom wall and extending between the widely spaced support intervals, the channel having a substantially hourglass configured cross-sectional shape with first a wide groove portion, then a narrowed entrance portion and finally a widened interior portion; an elongated tubular plastic member for reinforcing the bottom wall having a substantially hourglass shaped cross-sectional shape conforming to the shape of the channel, the reinforcement member having relatively wide side portions separated by a narrowed neck portion, the neck portion being dimensioned to fit between the tanks wall portions which define the narrowed entrance portion whereby the reinforcement member is secured in the channel; the plastic tank and reinforcement member being sufficiently resilient to allow pressing the member's side portion past the narrowed entrance portion and into the interior portion of the channel so that the reinforcement member is secured in the channel.

3. The reinforced plastic fuel tank in claim 2 in which the tank is formed by blow molding which heats the plastic to a relatively high temperature and the reinforcement member is pressed into the channel while the plastic tank is hot which facilitates the entry of the reinforcement member and permits the tank to cool and cause the channel forming portions to contract about the reinforcing member.

4. The reinforced plastic tank set forth in claim 3 in which the reinforcing members are of glass filled thermosetting plastic composite.

5. The reinforced plastic tank set forth in claim 3 in which the fuel tank is blow molded of a thermosetting plastic material.

* * * * *